(12) United States Patent
Schmidt et al.

(10) Patent No.: US 12,435,795 B2
(45) Date of Patent: Oct. 7, 2025

(54) VALVE

(71) Applicant: Eugen Seitz AG, Wetzikon (CH)

(72) Inventors: Joachim Schmidt, Hettlingen (CH); Stefan Köhle, Wetzikon (CH); Roland Schnetzer, Tägerwilen (CH); Mathias Fehlmann, Pfäffikon (CH)

(73) Assignee: Eugen Seitz AG, Wetzikon (CH)

( * ) Notice: Subject to any disclaimer, the term of this patent is extended or adjusted under 35 U.S.C. 154(b) by 0 days.

(21) Appl. No.: 18/333,761

(22) Filed: Jun. 13, 2023

(65) Prior Publication Data

US 2023/0400105 A1    Dec. 14, 2023

(30) Foreign Application Priority Data

Jun. 14, 2022    (EP) .................................... 22178941

(51) Int. Cl.
| | |
|---|---|
| *F16K 1/54* | (2006.01) |
| *F16K 1/36* | (2006.01) |
| *F16K 31/383* | (2006.01) |
| *F16K 39/02* | (2006.01) |

(52) U.S. Cl.
CPC .................. *F16K 1/54* (2013.01); *F16K 1/36* (2013.01); *F16K 31/383* (2013.01); *F16K 39/022* (2013.01)

(58) Field of Classification Search
CPC .................................................. F16K 39/022
See application file for complete search history.

(56) References Cited

U.S. PATENT DOCUMENTS

| | | | | | |
|---|---|---|---|---|---|
| 1,772,406 | A | * | 8/1930 | Whiton ................... | G05D 16/10 251/282 |
| 2,897,836 | A | * | 8/1959 | Peters .................... | F16K 39/022 251/282 |
| 3,038,499 | A | * | 6/1962 | Dumm ................... | F16K 39/022 251/282 |
| 3,087,705 | A | * | 4/1963 | Hamilton ............... | F16K 39/022 251/282 |
| 3,572,382 | A | * | 3/1971 | Luthe ..................... | F16K 39/022 251/282 |
| 4,210,311 | A | * | 7/1980 | Stone ...................... | F16K 39/02 251/282 |
| 8,308,130 | B2 | * | 11/2012 | Vaz De Azevedo ......... | F16K 31/0655 251/282 |
| 2010/0170583 | A1 | | 7/2010 | Gessaman | |

(Continued)

FOREIGN PATENT DOCUMENTS

| | | |
|---|---|---|
| DE | 102014000814 A1 | 7/2015 |
| DE | 102016209439 A1 | 7/2017 |

(Continued)

*Primary Examiner* — Eric Keasel
(74) *Attorney, Agent, or Firm* — The Webb Law Firm

(57) ABSTRACT

A valve, in particular of an extrusion blow moulding machine or a stretch blow moulding machine for manufacturing hollow bodies, has a movable piston, a process fluid region and a compensation chamber. The piston has a free front face which faces the process fluid region with a circumferential outer sealing region. At least one connecting channel connects the process fluid region to the compensation chamber. The free front face of the piston has an elevation, which is surrounded by the outer sealing region. The elevation protrudes over the outer circumferential sealing region. The valve permits a rapid and precisely timed opening.

16 Claims, 2 Drawing Sheets

(56) References Cited

U.S. PATENT DOCUMENTS

| | | |
|---|---|---|
| 2019/0285188 A1 | 9/2019 | Qiu et al. |
| 2021/0001534 A1 | 1/2021 | Ramsperger et al. |
| 2022/0347911 A1 | 11/2022 | Schmidt |

FOREIGN PATENT DOCUMENTS

| | | |
|---|---|---|
| EP | 1574771 A2 | 9/2005 |
| EP | 2142830 B1 | 11/2010 |
| EP | 3530431 A1 | 8/2019 |
| EP | 4082751 A1 | 11/2022 |
| FR | 3056670 A1 | 3/2018 |
| WO | 2015121285 A1 | 8/2015 |
| WO | 2017079531 A1 | 5/2017 |
| WO | 2019105783 A1 | 6/2019 |

\* cited by examiner

VALVE

CROSS REFERENCE TO RELATED APPLICATION

This application claims priority to European Patent Application No. 22 178 941.5, filed Jun. 14, 2022, the disclosure of which is hereby incorporated by reference in its entirety.

BACKGROUND OF THE INVENTION

Field of the Invention

The present invention relates to a valve, in particular for pneumatic switching in a blow moulding process, and a piston for use in such a valve. The valve is suitable, in particular, for use in an extrusion blow moulding machine or a stretch blow moulding machine for producing hollow bodies made of plastics.

Description of Related Art

Blow moulding devices or blow moulding machines serve for moulding hollow bodies, in particular for manufacturing plastic bottles made of PP (polypropylene) or PET (polyethylene terephthalate). Generally a pre-heated preform is connected to a blowing nozzle of the blow moulding machine. By blowing in a process gas, preferably compressed air, the preform is widened. The desired shape can be achieved by the use of blow moulds.

The manufacture or moulding of such hollow bodies by means of blow moulding machines takes place within a few seconds, preferably within 1 to 3 s, wherein the process gas is blown in over two or more stages. The individual blow moulding steps, such as the venting, are controlled by means of valves. Thus high requirements are set for these valves. The valves have to be able to switch as precisely and as rapidly as possible. Their response times have to be as short as possible. Moreover, a high number of switching cycles and thus a long service life are desired. Pneumatically pre-controlled valves have proved advantageous. These valves have a main valve with a pneumatically actuated piston. The corresponding control gas, generally control air, is controlled by means of two pilot valves. The pilot valves are generally solenoid valves, i.e. magnetic valves.

Hollow bodies, in particular bottles, are increasingly manufactured with relatively thin walls. Recycled PET, which can have irregularities in the material, is also increasingly used. Both require valves which switch in a very precisely timed and rapid manner and which permit, in particular, a sharp pressure increase when the valve is opened. High flow forces when opening and/or when closing the valve can also negatively influence the behaviour of the valve.

EP 1 574 771 A2, EP 2 142 830 B1, EP 3 530 431 A1 disclose pre-controlled valves which can be opened and closed by means of the control pressure independently of the process pressure. WO 2019/105783 A1 also discloses a valve with a pressure-compensated piston, wherein the piston has a circumferential sealing cap protruding toward a flexible and/or resilient seat seal. The sealing cap has a sealing edge tapering to a point.

Valves with pressure-compensated pistons permit very short and precise switching times. Rapid reaction times can be achieved due to their minimized control surfaces. A drawback, however, is that their small control surfaces result in low drive forces, whereby the piston reacts in a sensitive manner to external influences.

FR 3 056 670 A1 further discloses a hydraulic valve for internal combustion engines with an inlet and an outlet which extend radially to the valve piston. An upwardly protruding lug with a spiral spring which serves for opening the valve is arranged on the output side below the piston.

SUMMARY OF THE INVENTION

It is thus an object of the invention to provide a valve which permits a rapid and precisely timed opening.

The valve according to the invention has a movable piston, a process fluid region and a compensation chamber. The piston has a free front face which faces the process fluid region with a circumferential outer sealing region. The piston also has at least one connecting channel which connects the process fluid region to the compensation chamber. According to the invention, the free front face of the piston has an elevation which is surrounded by the outer sealing region, wherein the elevation protrudes over the circumferential outer sealing region.

The process fluid is generally compressed air.

The valve according to the invention is provided with a front face which has an elevation instead of the generally flat configuration. As a result, the valve has a piston geometry which is optimized in terms of flow. Due to the elevation, it is possible to compensate for external influences in an improved manner. The valve is thus less susceptible to external influences.

The elevation leads to a deflection of the flow of the process fluid when the valve is opened. As a result, the pressure compensation in the region of the at least one connecting channel is influenced such that a negative pressure is produced in this region and this exerts a force on the piston in the opening direction of the piston. This opening tendency is further increased by the influence of the pressure in the compensation chamber, which is made possible by the connecting channel. These forces, which are produced by the deflection of the flow and the influence of the pressure, are of a size which compensates for a force which is produced by the Bernoulli effect on the edges of the valve when the valve is opened and which pulls the piston in the closing direction. The Bernoulli effect occurs, in particular, in the sealing region. The forces produced by the deflection of the flow and the influence of the pressure, preferably compensate at least for the force caused by the Bernoulli effect.

By selecting the height of the elevation and/or by selecting the shape of the elevation, in particular the inclination and shape of its lateral surface, it is possible to influence the size of the forces acting against one another.

Preferably, the valve is designed such that these three effects, i.e. a double opening tendency and a single closing tendency, are balanced out. This also permits a closing of the valve which is as rapid as possible, in addition to the rapid and precisely timed opening.

In preferred exemplary embodiments, therefore, the height and/or the shape of the elevation is selected such that the forces acting in the opening direction are approximately or exactly the same size as the force acting in the closing direction and produced by the Bernoulli effect. This permits not only a rapid and precisely timed opening behaviour but it is also ensured that the valve can be reliably closed with a greater flow of the fluid process gas. This is the case, in particular, when the process fluid cannot flow away, as can arise, for example, in the event of a burst bottle or when a blank is absent.

The valve is preferably a blowing valve of a blow moulding machine, for example a main blowing valve or a pre-blowing valve.

The valve according to the invention permits a rapid and precisely timed opening. The productivity of a blow moulding machine can be increased thereby. The output of the blow-moulded bottles can be increased. The carbon footprint is thus improved since more bottles are produced with the same infrastructure.

By its improved precision, the valve according to the invention permits an increased use of recycled PET which has irregularities in the material and, as a result, requires a narrower production process window. The carbon footprint or the environmental footprint is increased thereby since less virgin material is required.

Additionally, the bottles can be configured to be thinner-walled, which in turn saves material and improves the carbon footprint.

The process fluid, generally blowing air, can be recovered to a greater degree, which in turn has a positive effect on the carbon footprint.

The at least one connecting channel is preferably arranged in the region of the elevation. Preferably, the at least one connecting channel passes through the elevation. This optimizes the deflection of the flow and thus improves the opening behaviour of the valve.

Preferably, the outer circumferential sealing region forms a sealing cap. The sealing cap preferably has a circumferential sealing edge. As a result, the sealing surface is minimized. Minimal control surfaces can be used. Preferably, a sealing cap and a seat seal are present, as is described in WO 2019/105783 A1.

Preferably, the elevation is arranged centrally in the outer circumferential sealing region. As a result, the deflection of the flow is also optimized, even with a rotating piston.

The elevation can be configured in different ways. Preferably, its lateral surface is configured to be rotationally symmetrical. The elevation can be configured, for example, in the shape of a truncated cone with a linear lateral surface, preferably in the shape of a straight truncated cone. Preferably, the elevation is a truncated cone with a concave curved or inwardly curved lateral surface, however, wherein the shape of the straight truncated cone is preferred here.

The inlet opening on the process fluid side of the at least one connecting channel can be arranged at different locations. For example, the inlet opening can be arranged in the flank of the elevation. Preferably, however, it is arranged centrally in the elevation.

The valve can be actuated in different ways. Preferably, the valve is controlled by pilot valve. The piston is actuated by means of a first control pressure and a second control pressure, wherein the piston has a first control surface for the application of the first control pressure and a second control surface for the application of the second control pressure. Preferably, the piston is compensated in terms of pressure relative to the process pressure, so that the valve can be actuated merely by means of the control pressures. Depending on the embodiment, a first control pressure is used for closing the valve and a second control pressure is used for opening the valve, wherein each control pressure is controlled by a separate pilot valve. In other embodiments, the first control pressure is constant over time and serves as a pneumatic spring and the second control pressure is varied. Such a valve is described in the as yet unpublished EP 21 171 205.4 of the applicant.

In preferred embodiments, the valve has a process fluid inlet opening which leads into the process fluid region, and a process fluid outlet opening which leads out of the process fluid region. The process fluid inlet opening and the process fluid outlet opening are arranged approximately at right-angles to one another.

Preferably, the surface of the process fluid inlet opening is arranged approximately parallel to a longitudinal axis of the piston and the surface of the process fluid outlet opening is arranged approximately perpendicularly to the longitudinal axis of the piston. In other words, the inflow direction preferably runs approximately perpendicularly to the longitudinal axis of the piston and the outflow direction preferably runs parallel to the longitudinal axis of the piston. As a result, forces are produced on the piston due to the flow of the process fluid, the forces being optimally compensated by means of the configuration of the valve according to the invention. The longitudinal axis is defined by the displacement movements of the piston when the piston is opened and closed.

The piston preferably defines a longitudinal centre axis. In preferred embodiments, this longitudinal centre axis runs in at least one connecting channel, i.e. the connecting channel is centrally arranged and runs parallel to the longitudinal axis of the piston and thus to the main direction of movement of the piston when opened and closed. The piston is optimally balanced thereby.

In further preferred embodiments, at least two connecting channels are present, wherein the at least two connecting channels run at an angle unequal to 0° from the longitudinal centre axis. Preferably two, three or four connecting channels, which are arranged equally distributed over the circumference of the piston, are present.

Preferably, the free front face between the elevation and the circumferential sealing region has a circumferential surface which runs perpendicularly to the longitudinal centre axis. The surface is preferably configured to be planar. In other words, the elevation terminates in a flattened portion in which the inlet opening of the connecting channel is preferably arranged.

Preferably, a seat seal opposing the sealing region is configured to be planar and runs perpendicularly to the longitudinal centre axis of the piston. This optimizes the flow path in the region of the sealing edge or the sealing region and deflects the flow to the flank, i.e. the lateral surface, of the elevation. Moreover, the seal is optimized thereby.

In preferred embodiments, for use in the valve according to the invention the piston has a free front face which can face the process fluid region with a circumferential outer sealing region. The piston also has a connecting channel which connects the process fluid region to the compensation chamber. The outer circumferential sealing region forms either a sealing cap with a circumferential sealing edge tapering to a point or it is configured to be planar and to run perpendicularly to a longitudinal centre axis defined by the piston. The free front face of the piston has an elevation which is surrounded by the outer sealing region. The elevation protrudes over the circumferential outer sealing region.

In preferred embodiments, the piston which can be used in the valve according to the invention or in other valves, has a free front face which can face the process fluid region with a circumferential outer sealing region. The piston has at least two connecting channels which connect the process fluid region to the compensation chamber and which run at an angle unequal to 0° from a longitudinal centre axis of the piston. The two connecting channels open centrally in the free front face (20) into a common inlet opening.

In preferred embodiments, the piston, which can be used in the valve according to the invention or in other valves, is configured to be substantially circular cylindrical with exactly one first, one second and one third cylinder portion having different diameters. Each of the cylinder portions has a recess running over its circumference for receiving a sealing ring for the purpose of forming a dynamic seal. The second cylinder portion located between the first and third cylinder portion has a larger diameter than the first and second cylinder portion. The piston has a free front face which can face the process fluid region with a circumferential outer sealing region, wherein the outer circumferential sealing region forms a sealing cap with a circumferential sealing edge tapering to a point. Alternatively, the outer circumferential sealing region is configured to be planar and to run perpendicularly to a longitudinal centre axis defined by the piston. The piston has a compensation surface which faces away from the free front face, wherein the compensation surface and the free front face are approximately the same size. The piston has at least one connecting channel which connects the process fluid region to the compensation chamber and which opens centrally in the free front face into an inlet opening, wherein the at least one connecting channel opens into the compensation surface. Preferably, the piston has a first control surface for the application of a first control pressure and a second control surface for the application of a second control pressure.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF THE INVENTION

Figure 1:
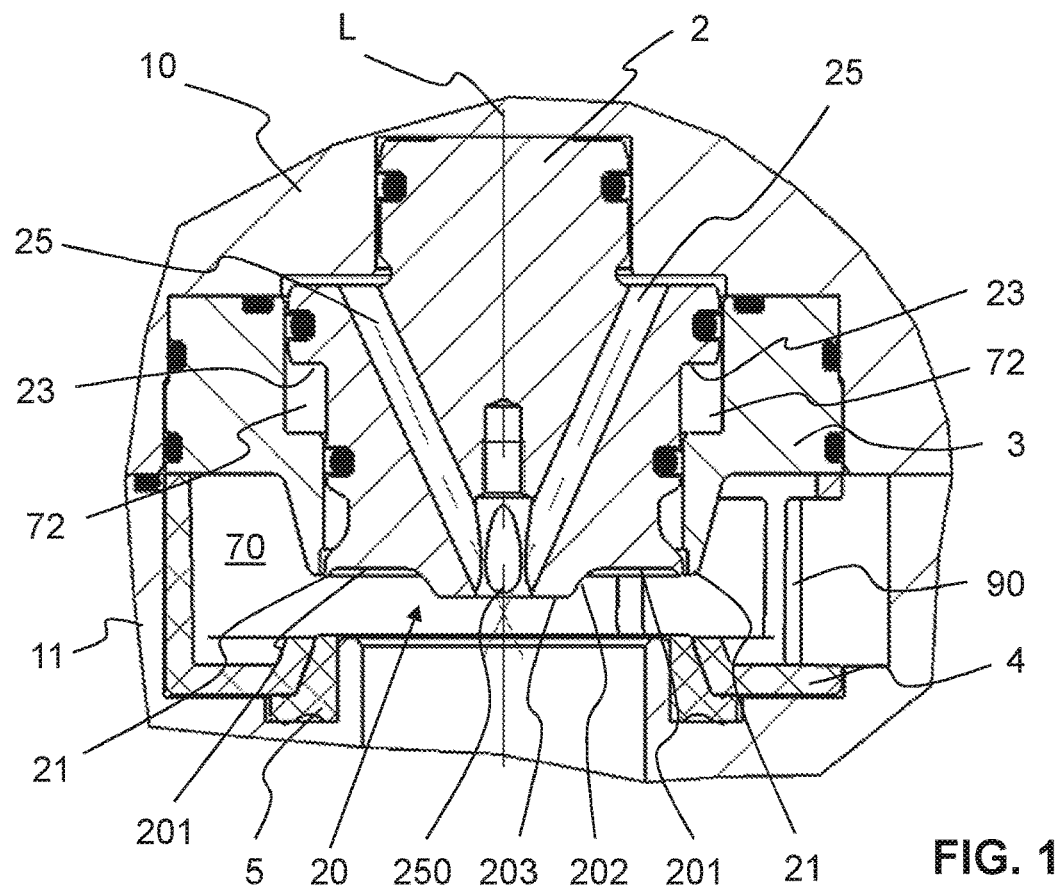
FIG. 1 shows a longitudinal section through a valve in a first embodiment in the open position.
Figure 2:
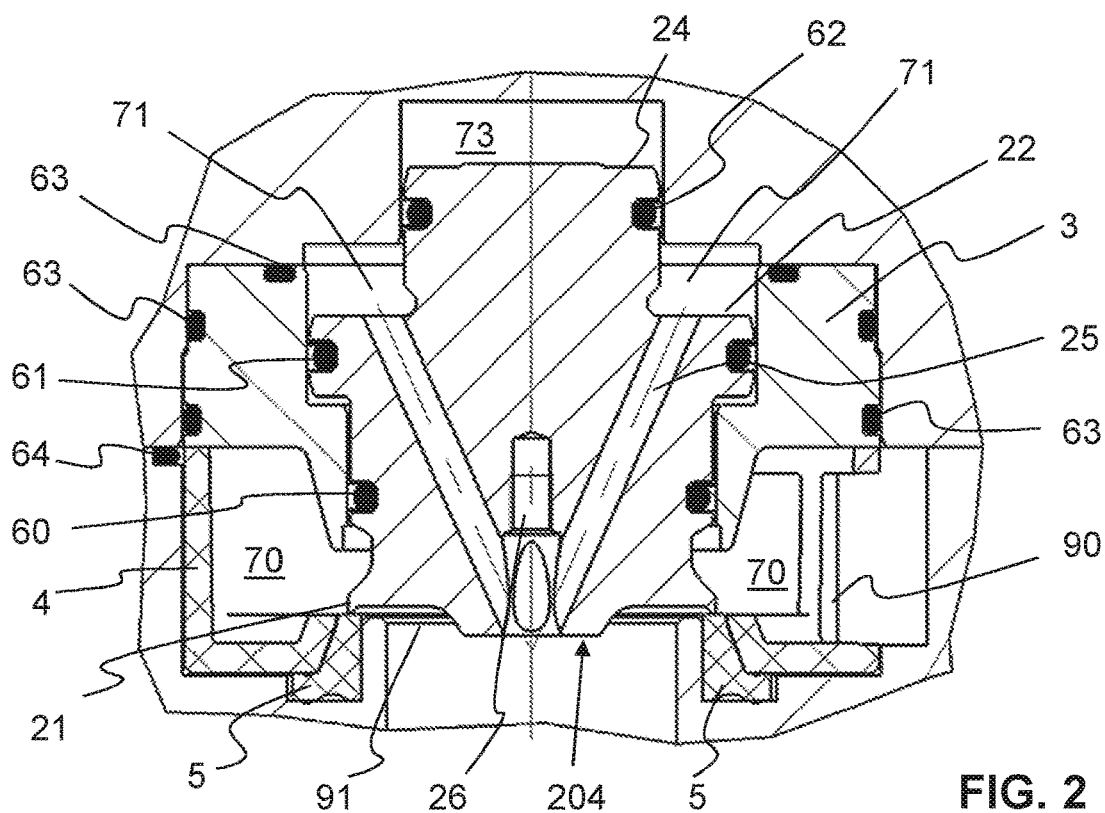
FIG. 2 shows the valve according to FIG. 1 in the closed position.

FIGS. 1 and 2 show a first exemplary embodiment of a valve according to the invention. The valve is preferably a process valve of a blow moulding machine, for example a main blowing valve or a pre-blowing valve.

The valve has a piston 2 and a piston receiver in which the piston 2 is movably held. The piston receiver is configured differently depending on the embodiment. The piston receiver is formed, for example, by a separate one-part or multi-part housing. In other embodiments, it is part of a control block of a blow moulding machine. In further embodiments, the piston receiver is, for example, part of a control block and a cover, wherein it comprises further components or consists of only these two components.

In the example shown here, the piston receiver is formed by a first housing part 10, a second housing part 11 and a guide apron 3. The two housing parts 10, 11 form a cavity in which the guide apron 3 is fixedly arranged. The guide apron 3 surrounds the piston 2, which is displaceable relative to the guide apron 3 and thus relative to the two housing parts 10, 11 along a longitudinal centre axis L of the piston 2.

The first and second housing parts 10, 11 are preferably configured as solid components which, where necessary, are provided with recesses, bores and channels. Spaces, such as for example a process fluid region 70, a compensation chamber 71, a first control chamber 72 and a second control chamber 73, are present in the cavity which is formed by the first housing part 10 and the second housing part 11, and in which the valve is located.

Seals, preferably sealing rings or sealing ring pairs, seal the guide apron 3 and the piston 2 relative to the housing parts 10, 11 and the piston 2 relative to the guide apron 3.

One of these seals forms a dynamic seal 60 which is arranged between the movable piston 2 and the guide apron 3 and forms a seal relative to the process fluid region 70.

The seals further comprise a first sealing ring 61 which is also arranged between the piston 2 and the guide apron 3 and seals the compensation chamber 71 relative to the first control chamber 72. A second sealing ring 62 is arranged between the piston 2 and the first housing part 10 and seals the compensation chamber 71 relative to the second control chamber 73. Third sealing rings 63 are static seals which are arranged between the guide apron 3 and the first housing part 10. At least one fourth sealing ring 64 is located between the first housing part 10 and the second housing part 11 and seals the valve relative to the surroundings.

The piston 2 opens and closes a connection between a process fluid inlet opening 90 and a process fluid outlet opening 91 leading to the blowing nozzle of the blow moulding machine. A process pressure source, not shown here, supplies the process fluid through the process fluid inlet opening 90, wherein the process fluid is guided through the process fluid outlet opening 91 into the blank, also not shown here, of the hollow body. The process fluid region 70 is located between the process fluid inlet opening 90 and the process fluid outlet opening 91.

The process fluid inlet opening 90 is preferably arranged radially to the piston 2. Its opening surface thus preferably runs parallel to the longitudinal centre axis L of the piston 2. The process fluid outlet opening 91 is preferably arranged axially to the piston 2. Its opening surface preferably runs perpendicularly to a longitudinal centre axis L of the piston 2. In this example, the process fluid outlet channel 910, which is downstream in the direction of flow, also runs parallel to the longitudinal centre axis L and thus to the direction of movement of the piston 2. However, alternatively, as for example is shown in the example according to FIGS. 3 and 4, it can run at an acute angle to the longitudinal centre axis L.

The guide apron 3 has a substantially cylindrical base body which on its outer face transitions into a portion having the shape of a truncated cone. The inner diameter of the guide apron 3 is substantially cylindrical, wherein it has a circumferential step. The guide apron 3 is preferably formed from a rigid material, preferably from metal. In FIG. 2, the valve is shown in the closed state. The piston 2 protrudes over the free conical end of the guide apron 3, preferably already in the open state of the valve.

The guide apron 3 is preferably fastened by means of the fastening screws, not shown here, to the first housing part 10, wherein as a result it also holds the piston 2 in the first housing part 10. The piston 2 is guided in the guide apron 3 during the closing and opening of the valve.

A seat seal 5 is arranged in the second housing part 11. The seat seal is preferably formed from a flexible, resilient annular body. The seat seal 5, as shown here, is preferably fixedly held by means of a hold-down device 4 in a recess of the second housing part 11. The hold-down device 4 is preferably an annular body made of a rigid material. The hold-down device is preferably clamped by means of the first housing part 10 and fixed in its position. Alternatively or additionally, the hold-down device is fixed by means of other fastening means to the second housing part 11. For example, the hold-down device is screwed directly to the second housing part 11. The hold-down device 4 preferably has the process fluid inlet opening 90.

The piston 2 has a free front face 20 with a sealing region 21 which faces the process fluid and thus the process fluid chamber 70. In the closed position this sealing region 21 is positioned on the seat seal 5 and thus closes the connection between the process fluid inlet opening 90 and the process fluid outlet opening 91. This is shown in FIG. 2.

The sealing region 21 is preferably configured in the form of a circumferential sealing cap tapering to a point, preferably as described in WO 2019/105783 A1. The sealing region 21, here the sealing cap, preferably runs in the outermost periphery of the free front face 20 of the piston 2. Preferably, the sealing region 21, here the sealing cap, has exactly or approximately the same diameter as the dynamic seal 60.

The piston 2 preferably has a relatively simple shape. The piston is preferably configured to be substantially circular-cylindrical, wherein it it made up of three or more cylinder portions with different diameters.

The piston 2 is penetrated by the connecting channels 25 which connect the process fluid region to the compensation chamber 71.

Preferably, in this embodiment two, three or four connecting channels 25 are arranged equally distributed in the piston 2. In this example, the connecting channels run obliquely to a longitudinal centre axis L, wherein they open into a common inlet opening 250 centrally in the free front face 20.

The inlet opening preferably extends into a bore 26 with a thread. This bore serves for the simplified removal of the piston 2 by means of a screw, not shown here, which can be inserted into the bore 26.

The piston 2 has a compensation surface 22 which faces away from the free front face 20 and is located in the compensation chamber 71. The connecting channels 25 terminate in the compensation surface 22.

In this example, the compensation surface 22 is configured on the cylinder portion of the piston 2 with the largest outer diameter. In this example, the compensation surface 22 is configured to be annular. In this example, the compensation chamber 71 is thus configured to be annular and, as can be identified in FIGS. 1 and 2, is located above the first control chamber 72 which is also configured to be annular.

The first control chamber 72 has an annular first control surface 23 which is oriented in the same manner as the free front face 20, i.e. toward the process fluid side.

In this example, the second control chamber 73 is located on the upper end of the piston 2, i.e. on the end facing away from the process fluid. In this example, the second control chamber is circular. The free upper front face of the piston 2 forms a circular second control surface 24 which faces in the direction opposing the first control surface 23.

The free front face 20 and the compensation surface 22 preferably have the same-sized surface area so that the piston 2 is pressure-compensated relative to the process pressure.

The first control surface 23 and the second control surface 24 preferably also have the same-sized surface area. Thus the piston 2 is also pressure-compensated relative to these two surface areas. The control surfaces 23, 24, however, preferably have a different surface dimension than the free front face 20 and the compensation surface 22.

The piston 2 is controlled by pilot valve. The control lines for supplying the control fluid are not identifiable in the figures. The control lines lead to the first control chamber 72 and to the second control chamber 73 and apply a control pressure to the first and the second control surface 23, 24 in each case.

Depending on the embodiment, two pilot valves are present and both control pressures are varied in order to open and to close the valve. Alternatively, one of the two control pressures can be permanent and preferably constant over time, and only the other control pressure is varied. The permanent control pressure acts as a pneumatic spring. To this end, a single pilot valve is sufficient. This variant is described in the as yet unpublished EP 21 171 205.4 of the applicant. Preferably, a pressure which is permanent and preferably constant over time is applied to the second control surface 24.

Preferably, compressed air is used as the process fluid and control fluid. The process pressure is generally ca. 40 bar. The control pressure is generally 5 bar to 10 bar, depending on whether it is used permanently or only as an alternative to the other control pressure.

According to the invention, the free front face 20 has an elevation 204. This elevation 204 is preferably located centrally to the longitudinal centre axis L. The elevation protrudes over the remaining region of the free front face 20, in particular the circumferential sealing region 21 formed by the sealing cap 21. Preferably, the region between the elevation 204 and the circumferential sealing region 21, here the sealing cap, is arranged to be recessed. This region is called the outer front face region 201. It is preferably configured to be planar and extends perpendicularly to the longitudinal centre axis L of the piston 2.

The elevation 204 is preferably configured in the shape of a truncated cone so that its free end forms an inner front face region 203. This is preferably configured to be planar and also preferably extends perpendicularly to the longitudinal centre axis L. The inner front face region 203 has the common inlet opening 250 of the connecting channels 25. This inlet opening is preferably arranged centrally to the longitudinal centre axis L of the piston.

The elevation 204 has a circumferential lateral surface 202. Depending on the embodiment, the lateral surface is configured in a rectilinear manner. Preferably, however, as shown here, the lateral surface is configured to be slightly inwardly curved, i.e. concave.

When the valve is opened, the process fluid flows from the process fluid inlet opening 90 along the sealing region 21, here along the sealing cap, to the process fluid outlet opening 91. The Bernoulli effect in the region of the sealing region 21 and possibly also in the region of the outer front face region 201 when the valve is opened, leads to a force in the closing direction of the piston 2. The process gas is deflected, however, due to the elevation 204 on the lateral surface 202 thereof. The at least one connecting line 25 and the compensation chamber 71 lead to a negative pressure in the region of the inner front face region 203 and thus to a force in the opening direction of the piston 2. The Bernoulli effect can be compensated thereby and the valve can be opened in a rapid and precisely timed manner.

Figures 3, 4:
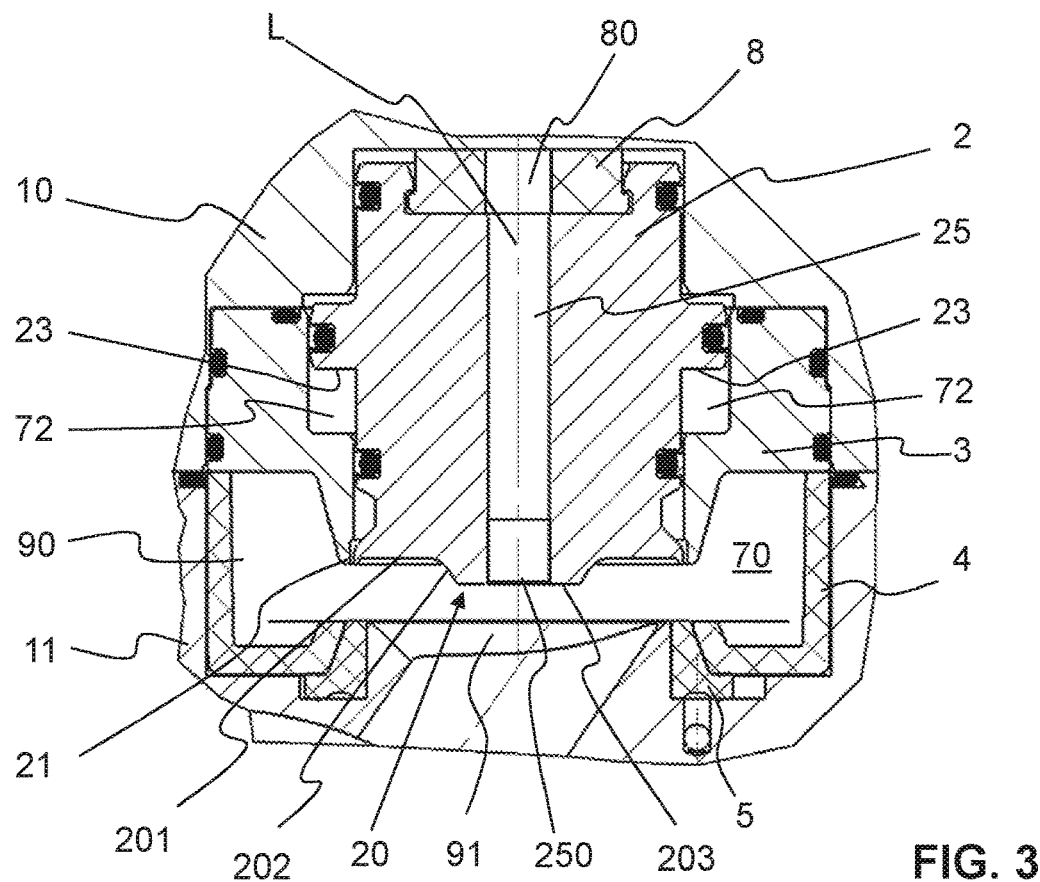
FIG. 3 shows a longitudinal section through a valve in a second embodiment in the open position and FIG. 4 shows the valve according to FIG. 3 in the closed position.

In FIGS. 3 and 4 a second exemplary embodiment of the valve according to the invention is shown. The same parts are provided with the same reference numerals as in the first exemplary embodiment. The parts are therefore not explained again. In this example, a single connecting channel 25 which runs centrally along the longitudinal centre axis L of the piston 2 is present. Alternatively, it is possible to use a plurality of connecting channels 25 running parallel to the longitudinal centre axis L. The compensation chamber 71 is thus located between the uppermost front face of the piston 2 and the first housing part 10. In this example, therefore, the uppermost front face forms the compensation surface 22. The circular cylindrical chamber between the uppermost front face and the first housing part 10 forms the compensation chamber 71.

Preferably, the piston 2 has in the second front face a recess into which an insert in the form of a damping element 8 is introduced. When the piston is opened, this damping element damps the abutment of the piston 2 against the first housing part 10. The damping element 8 is preferably produced from a flexible and/or resilient material. The damping element has a through-opening suitable for the connecting channel 25.

In this example, the second control chamber 73 and the second control surface 24 are located in the annular structure of the cylinder portion with the largest circumference. They are therefore configured in an annular manner.

The control in turn takes place by means of two pilot valves in the case of different varied pressures or with a single pilot valve for a variable pressure in the first control chamber and a permanent pressure and preferably without a further pilot valve in the second control chamber.

The free front face 20 of the piston 2 is configured in the same manner as in the first exemplary embodiment. The mode of operation is the same as described above.

The process fluid inlet opening 90 in these sectional views is not identifiable as an opening. The position thereof, however, is provided with the reference sign 90. The process fluid inlet opening can also be arranged at a different position, in particular diagonally opposite.

In this exemplary embodiment, the process fluid outlet channel 910 runs at an angle unequal to 0° from the longitudinal centre axis L. The process fluid outlet channel can, however, also run parallel thereto. The process fluid outlet channel 910 of the first exemplary embodiment can also run obliquely to the longitudinal centre axis L.

The two valves are merely by way of example in order to show the mode of operation of the elevation according to the invention in combination with the connecting channel and the compensation chamber. Examples of variants which implement the inventive idea are as follows:

The free front face can be designed differently in both exemplary embodiments. The elevation 204 is preferably arranged centrally but can also be arranged decentrally. Preferably, the elevation is configured rotationally symmetrically. However, it can also be shaped differently, for example it can run obliquely relative to the longitudinal centre axis L.

The inlet opening 250 of the connecting channel 25 is preferably located at the highest point of the elevation. However, it can also be arranged in the lateral surface 202 or even adjacent to the elevation 204 in the outer front face region 201.

The outer front face region 201 preferably runs in a planar manner and perpendicularly to the longitudinal centre axis L of the piston 2. However, it can also be configured in an oblique or curved manner.

The sealing region 21 preferably has the shape of a sealing cap 21 with a sealing edge tapering to a point. The sealing region can also be configured differently, for example in a planar manner and aligned with the outer front face region 201.

A guide apron 3 and a hold-down device 4 are preferred but not necessary. The piston 2 and the sealing seal 5 can be guided or held in different ways in the piston receiver.

The process fluid inlet opening 90 and the process fluid outlet opening 91 can also be arranged at a different angle from one another and from the longitudinal centre axis L of the piston 2.

Moreover, the piston 2 can be arranged rotatably or fixedly in terms of rotation in the piston receiver.

The two valves shown are simple to manufacture, to assembly and to replace due to the configuration of the piston 2, the configuration of the control surfaces 23, 24, the apron 3 and the hold-down device 4. The valve, however, can also be configured differently. For example, basic shapes of known valves can be provided with the elevation 204 according to the invention in the front face 20 facing the process fluid.

The valve according to the invention permits a rapid and precisely timed opening.

The invention claimed is:

1. A valve comprising a movable piston, a process fluid region and a compensation chamber
   a) wherein the piston has a free front face which faces the process fluid region with a circumferential outer sealing region, and
   wherein the piston has at least one connecting channel which connects the process fluid region to the compensation chamber,
   b) wherein the outer circumferential sealing region forms a sealing cap with a circumferential sealing edge tapering to a point, or
   wherein the outer sealing region is configured to be planar and to run perpendicularly to a longitudinal centre axis defined by the piston, and
   c) wherein the free front face of the piston has an elevation which is surrounded by the outer sealing region,
   d) wherein the elevation protrudes, in a closing direction of the valve, over the circumferential outer sealing region,
   (e) wherein the piston, for opening and closing the valve, is actuated by means of a first control pressure and a second control pressure, and
   wherein the piston has a first control surface for the application of the first control pressure and a second control surface for the application of the second control pressure.

2. The valve according to claim 1, wherein the at least one connecting channel passes through the elevation.

3. The valve according to claim 1, wherein a region between the elevation and the circumferential sealing region is arranged to be recessed relative to the elevation and the circumferential sealing region.

4. The valve according to claim 1, wherein the elevation is arranged centrally in the outer circumferential sealing region.

5. The valve according to claim 1, wherein the elevation is configured in the shape of a truncated cone.

6. The valve according to claim 1, wherein the elevation has an inwardly curved circumferential lateral surface.

7. The valve according to claim 1, wherein the at least one connecting channel has an inlet opening which is arranged centrally in the elevation.

8. The valve according to claim 1, wherein the piston has a compensation surface facing the compensation chamber, wherein the free front face and the compensation surface are approximately the same size and the piston is therefore compensated in terms of pressure relative to a process pressure.

9. The valve according to claim 1, wherein the valve has a process fluid inlet opening which leads into the process fluid region, and a process fluid outlet opening which leads out of the process fluid region, and wherein the process fluid inlet opening and the process fluid outlet opening are arranged approximately at right-angles to one another.

10. The valve according to claim 9, wherein the process fluid inlet opening defines an inflow direction which runs approximately perpendicularly to a longitudinal centre axis of the piston and the process fluid outlet opening defines an outflow direction which runs approximately parallel to the longitudinal centre axis of the piston.

11. The valve according to claim 1, wherein exactly one connecting channel is present and wherein the longitudinal centre axis runs in the exactly one connecting channel.

12. The valve according to claim 1, wherein at least two connecting channels are present and wherein the at least two connecting channels run at an angle unequal to 0° from the longitudinal centre axis.

13. The valve according to claim 1, wherein the free front face between the elevation and the circumferential sealing region has a circumferential surface which runs perpendicularly to the longitudinal centre axis.

14. The valve according to claim 13, wherein the circumferential surface is configured to be planar.

15. The valve according to claim 1, wherein a seat seal opposing the sealing region is configured to be planar and runs perpendicularly to the longitudinal centre axis of the piston.

16. A piston for use in a valve, wherein the valve has the piston, a process fluid region, and a compensation chamber,
    wherein the piston comprises a free front face which can face the process fluid region with a circumferential outer sealing region, and
    wherein the piston comprises at least one connecting channel which connects the process fluid region to the compensation chamber,
    a) wherein the outer circumferential sealing region forms a sealing cap with a circumferential sealing edge tapering to a point, or
    wherein the outer sealing region is configured to be planar and to run perpendicularly to a longitudinal centre axis defined by the piston, and
    b) wherein the free front face of the piston has an elevation which is surrounded by the outer sealing region,
    c) wherein the elevation protrudes, in a closing direction of the valve, over the circumferential outer sealing region,
    d) wherein the piston, for opening and closing the valve, is actuated by means of a first control pressure and a second control pressure, and
    wherein the piston has a first control surface for the application of the first control pressure and a second control surface for the application of the second control pressure.

* * * * *